Aug. 6, 1946.   F. A. WASSELL   2,405,542
FUSION WELDING
Filed Sept. 13, 1943
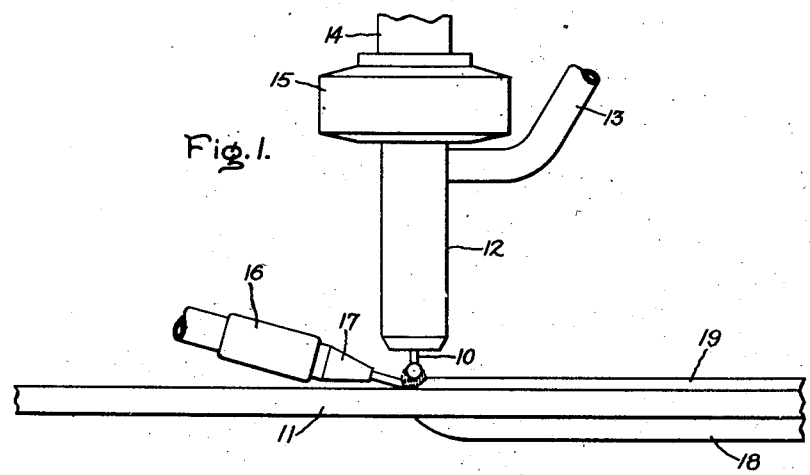
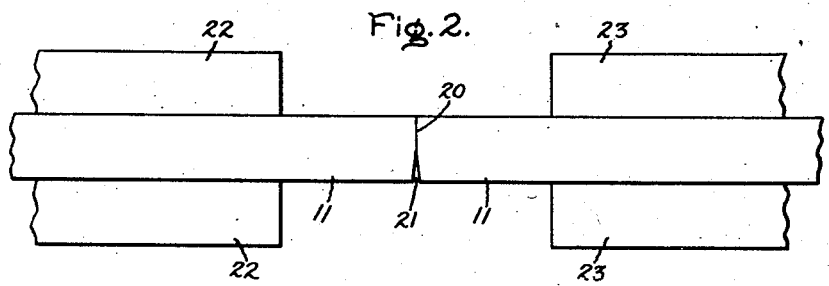
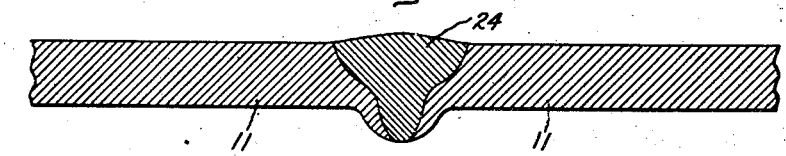
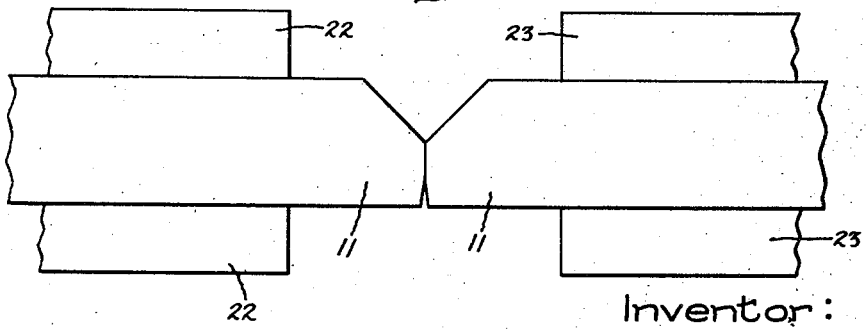
Inventor:
Frank A. Wassell,
by Harry E. Dunham
His Attorney.

Patented Aug. 6, 1946

2,405,542

UNITED STATES PATENT OFFICE 2,405,542

FUSION WELDING

Frank A. Wassell, Schenectady, N. Y., assignor to General Electric Company, a corporation of New York Application September 13, 1943, Serial No. 502,091

12 Claims. (Cl. 219—10)

My invention relates to fusion welding and more particularly to an improved method of fusion welding parts of magnesium, aluminum and alloys of either of these metals which are readily oxidizable to form over the molten portions thereof a refractory oxide skin which increases the effect of surface tension on these molten portions.

It is an object of my invention to provide a method of fusion welding which reduces the amount of drop down required to obtain complete fusion at the bottom of a weld between parts whose molten edges freeze rapidly and have a surface skin which not only increases the surface tension effect and the size of the molten edges but also prevents them from wetting one another and intermingling.

It is a further object of my invention to eliminate the fine crack at the bottom of a fusion weld between parts of aluminum, magnesium or alloys of either of these metals which are butted together and welded along their joining edge portions with that fusion required for a good even drop down of desired amount along the bottom surfaces of these edge portions when a welding agency is applied to the top surfaces of these edge portions.

Further objects of my invention will become apparent from the following description thereof.

In accordance with my invention the top edge portions of the parts to be welded are beveled, if necessary, to form joining edges about ⅓ inch thick. These joining edges are smoothed so that a good contact can be had therebetween and the bottom edge portions of the parts along said joining edges are beveled so that they are separated from one another by an amount sufficient to permit the edge portions of the parts at said joining edges to drop down and away from one another without coming into contact with one another when rendered molten during welding. Prior to welding, the parts are placed together with their joining edges in contact with one another and with their bottom edge portions free to drop down when rendered molten. A welding agency is then applied to the top surfaces of the edge portions of said parts at their joining edges and the parts and the welding agency are traversed relative to one another under conditions which will fuse the edge portion of the parts sufficiently to cause them to drop down and away from one another and form a gap between the parts. Simultaneously with this fusing of the edge portion of the parts, filler metal is supplied to the welding agency and fused thereby in sufficient quantity to fill the gap between the parts and thereby complete the weld which unites them.

This welding procedure and the preparation of the edge portions of the parts to be welded forming a part of this procedure have been illustrated in the accompanying drawing. Fig. 1 of this drawing shows apparatus suitable for performing my method of welding; Fig. 2 shows the edge preparation in accordance with my invention when welding sheets of about ⅛ inch in thickness; Fig. 3 shows the resulting weld when performing my method of welding; and Fig. 4 shows the edge preparation in accordance with my invention when welding sheets greater than ⅛ inch in thickness.

Although magnesium, aluminum and alloys of either of these metals having the characteristics of magnesium and aluminum may be flame welded, I prefer to employ that form of arc welding in which the arc and those portions of the metal rendered molten thereby are protected by a shielding atmosphere of a monatomic gas, such as helium or argon. Arc welding in such atmospheres has been described and claimed in U. S. Letters Patent 1,746,081—Henry M. Hobart, February 4, 1930, and 1,746,191—Philip K. Devers, February 4, 1930, both of which are assigned to the assignee of this application.

When using the procedures disclosed in these patents it is not necessary to employ welding fluxes as when welding with either the oxyacetylene or oxy-hydrogen flame. Since the fluxes used in flame welding magnesium, aluminum and their alloys, are corrosive in nature, their use requires complete cleaning of the welded parts and for this reason arc welding in a shielding atmosphere of helium or argon is much to be preferred.

I have found, however, that when welding parts which are formed of magnesium, aluminum and their alloys and which are butted together prior to welding, complete fusion of the butting edges of the parts along their bottom edges cannot be obtained when the arc is applied to their top surfaces unless an excessive and undesirable amount of drop down is provided. By drop down I refer to the fusion and dropping down of the butting edge portions of the parts to form a reenforcement along their bottom edges which form part of the weld. This lack of fusion at the root of the weld is evidenced by a fine line which upon examination proves to be the exterior of a crack extending into the weld. Its presence in the weld weakens it and causes failure in the weld when the welded assembly is subjected to mechanical strain.

This crack may be eliminated if an excessive amount of fusion and drop down is allowed on the under side of the weld. This procedure is undesirable, however, in that it slows up the welding operation and produces a larger reenforcement along the bottom edges of the parts at the weld than is desirable or necessary.

It is also possible to eliminate this crack at the root of the weld by leaving sufficient clearance between the two edges of the parts to be welded. This procedure will insure complete weld penetration and the elimination of the undesirable crack but is likewise undesirable because it requires very accurate spacing of the parts to get a good even drop down and because it is difficult to hold the desired spacing between the parts due to the contraction forces of the solidifying weld metal.

I have found that complete fusion at the bottom of the weld may be obtained if, before welding, the parts are beveled very slightly along their bottom edges to form between them an outwardly opening gap. When assembled with their unbeveled joining edges in contact with one another, these joining edges resist the contraction forces of solidifying weld metal formed between the parts and the bottom bevel or gap between the parts allows the molten edge portions of the parts to drop down and away from one another so that additional material supplied between their molten edge portions fills the gap between the parts forming a sound crack-free weld. Welds made in accordance with my procedure will invariably fail to one side of the weld in the parent metal, thus clearly demonstrating the elimination of any bottom cracks. Furthermore, photomicrographs of welds made in accordance with my invention show the complete elimination of such cracks at the root of the weld. When following my procedure the rate of welding may be so controlled as to obtain the desired amount of drop down and bottom reenforcement of the weld. Furthermore, sufficient additional material may be added to the weld to obtain any desired configuration along the upper surface portions of the weld.

My welding procedure is best effected by the use of automatic apparatus which completely eliminates many of the variables which are characteristic of hand welding operations. It is to be understood, however, that my procedure may be performed by hand welding.

In Fig. 1 of the accompanying drawing I have diagrammatically illustrated automatic apparatus suitable for performing my method of welding. As shown therein a direct current arc is established between a tungsten electrode 10 and the top surfaces of the parts to be welded 11 at their butting edges. Best results are obtained when electrode 10 is connected to the positive terminal of the source of welding current. A shielding atmosphere of helium, argon or an equivalent gas is supplied about the arc and the molten portion of the parts being welded, through a nozzle 12 which is connected through a pipe 13 to a suitable source of supply. Nozzle 12 is mounted on a support 14 through the agency of an insulating member 15. Additional material is supplied to the arc by feeding through a nozzle 16 a filler rod 17 having substantially the same composition as the parts being welded.

The welding arc and parts to be welded are traversed relative to one another at a substantially uniform rate of speed and the filler rod 17 is uniformly fed into the arc to supply the necessary amount of material to fill the gap between the molten edge portions of the parts being welded. Preferably, the filler rod 17 is inclined away from the electrode 10 at least 60° in order to obtain a more uniform fusion thereof. If the angle between the filler rod and the electrode is less than 60°, the heat reflected from the arc may cause large sections thereof to melt and fall down in large globules which will cause very uneven beads and decreased weld penetration. As previously pointed out, the bottom edges of the parts are unsupported and during welding may sag and drop down to form a bottom bead 18. Sufficient filler material 17 may be supplied to the arc to produce a top bead 19.

If the parts to be welded 11 are about ⅛ inch or less in thickness their edge portions are prepared and assembled in the manner shown in Fig. 2. Their joining edges 20 are made smooth so that a good contact can be had therebetween along their top half portions. The bottom edge portions of the parts are beveled at their joining edges to form an outwardly opening gap 21 between the bottom half portions of their joining edges. This gap is preferably from 0.005 to 0.025 inch wide at the bottom surfaces of the parts. I have found, however, that this bevel may be greatly increased and have beveled the bottom edges of the parts at their joining edges to form a V-groove of 90° when practicing my invention. The parts are then held in supports 22 and 23 with their joining edges 20 in contact with one another and with their bottom edge portions along said joining edges free to drop down when rendered molten.

In Fig. 3 I have shown a cross section of a weld 24 formed between parts 11 in accordance with my procedure above described. The root of this weld is free of the crack which would otherwise be present if the bottom edges of the parts were not beveled before welding with that application of heat to their top surfaces which produces that fusion which results in the desired amount of drop down.

The section of Fig. 3 is illustrative of a weld between ⅛ inch sheets of an alloy containing 6 per cent aluminum, 0.7 per cent zinc, 0.2 per cent manganese and the balance magnesium. A 65 ampere, 16½ volt welding arc was employed and the travel speed and the rate of welding was about 13 inches per minute. The electrode 10 was formed of tungsten and was connected to the positive terminal of a direct current source of welding current. Sufficient helium was supplied about the arc and molten top portions of the parts at their joining edges to protect these molten portions from the oxidizing influence of the surrounding atmosphere.

When welding magnesium, aluminum and alloys of these metals it is my belief that the natural surface tension effect of their molten portions at the edges to be welded causes large globular formations which come together and prevent the arc or other welding agency applied to their top surfaces from obtaining through penetration unless the amount of molten metal is increased by increasing the welding heat to an extent that results in an undesirable drop down of the molten edges. This surface tension effect is greatly increased by a tough skin of oxide that forms on the molten edges of the parts at their joining edges and by the fact that this oxide skin prevents the molten parts from wetting one another and intermingling. In accordance with my invention where the bottom edges of the parts are beveled, the molten edge portions of the parts are free to fall away from one another forming a gap which is then filled with additional molten material. This additional material flushes the surface portions of the molten edges of the parts forming a good bond therewith. An examination of welds made in accordance with my invention shows along the under side of the weld two parallel lines which are apparently the surfaces of union between the molten edge portions of the parts and the molten material added therebetween to complete the weld. The presence of these lines and a faint intermediate line are believed to be evidences of the surface tension effects above referred to. Photomicrographs of welds made in accordance with my invention definitely show that these parallel lines are not surface manifestations of cracks in the weld but are at most merely surface phenomena in no way affecting the strength of the weld. Welded assemblies made in accordance with my invention will, when sufficiently stressed, break in the parent metal adjacent the weld.

When welding parts having a thickness greater than ⅛ inch, the edge portions of the parts to be welded 11 are prepared in the manner illustrated in Fig. 4. That is, the edges of the parts are beveled to form joining edges about ⅛ inch in thickness and these edges are prepared in the manner previously stated. The parts are supported in clamps 22 and 23 so that their bottom edge portions are free to drop down as in Fig. 2 and the prepared edges are first joined in the manner above described. Thereafter the groove between the parts formed by their beveled top edges is filled to complete the weld by supplying additional material to the welding agency and traversing it and the parts relatively to one another along the beveled top edge portions of the parts a sufficient number of times to fuse them and fill the groove formed thereby with molten filler material.

Although not illustrated in the drawing or referred to above, I have found that it is possible to weld in accordance with my procedure when using a grooved backing member against the under side of the joining edge portions of the parts to be welded. This backing member is preferably formed of metal having a low heat conductivity. That is, it is more desirable to use a backing member formed of stainless steel than one formed of copper. The grooved portion of the backing member should be located immediately under the joining edges of the parts and should be of sufficient width so that the molten edge portion of the parts are free to drop down when rendered molten.

Although I have above referred to the use of an electric arc when performing my method of welding it is to be understood that any suitable welding agency may be used without departing from the spirit and scope of my invention. It is also to be understood that the amount of bevel, welding heat, speed of welding and other factors involved in practicing my invention may be varied as required by the different surface tension characteristics of magnesium, aluminum and light weight alloys of either of these metals which are readily oxidizable to form over their molten portions a refractory oxide skin.

What I claim as new and desire to secure by Letters Patent in the United States is:

1. The method of fusion welding metallic parts having joining edges about ⅛ inch thick which when molten assume large globular formations whose surfaces do not readily intermingle to form a weld, said method comprising preparing said joining edges of said parts and positioning said parts relatively to one another so that the top edge portions of said joining edges of said parts make a good contact with one another along their lengths and so that when said top edge portions of said joining edges are in contact with one another their bottom edge portions are sufficiently spaced from one another along their lengths by an outwardly opening gap which separates the bottom edge portions of said joining edges of said parts by an amount sufficient to permit said joining edges of said parts to drop down and away from one another without coming into contact with one another when rendered molten during welding, supporting said parts with their said joining edges in contact with one another and so that their bottom edge portions at said joining edges are free to drop down when rendered molten, progressively applying heat lengthwise of the top edge portions of said joining edges of said parts to render said joining edges sufficiently molten to drop down and away from one another and form a gap between said parts, and as said joining edges of said parts become molten and drop down and away from one another supplying molten filler material in sufficient quantity to fill the gap formed between said parts at said molten joining edges and thereby complete a weld between said parts.

2. The method of fusion welding metallic parts having joining edges about ⅛ inch thick which when molten assume large globular formations whose surfaces do not readily intermingle to form a weld, said method comprising smoothing said joining edges so that good contact can be had therebetween, beveling the bottom edge portions of said parts along said joining edges so that when their top edge portions are in contact with one another their bottom edge portions are separated from one another by an amount sufficient to permit the edge portions of said parts at said joining edges to drop down and away from one another without coming into contact with one another when rendered molten during welding, supporting said parts with the top edge portions of said joining edges in contact with one another and with their said bottom edge portions free to drop down when rendered molten, applying heat to said top edge portions of the joining edges of said parts to render them sufficiently molten to drop down and away from one another and form a gap between said parts, and as said joining edges of said parts become molten and drop down and away from one another supplying molten filler material in sufficient quantity to fill the gap between said parts and thereby complete a weld between them.

3. The method of fusion welding metallic parts having joining edges about ⅛ inch thick which when molten assume large globular formations whose surfaces do not readily intermingle to form a weld, said method comprising smoothing said joining edges so that good contact can be had therebetween, beveling the bottom edge portions of said parts along said joining edges so that when their top edge portions are in contact with one another their bottom edge portions are separated from one another along their lengths by an outwardly opening gap at least .005 inch in width at the bottom edge portions of said joining edges of said parts, supporting said parts with the top edge portions of said joining edges in contact with one another and with their said bottom edge portions free to drop down when rendered molten, progressively applying heat lengthwise of the top edge portions of the joining edges of said parts to render them sufficiently molten to drop down and away from one another and form a gap between said parts, and as said joining edges of said parts become molten supplying thereto molten filler material in sufficient quantity to fill the gap between said parts and thereby complete a weld between them.

4. The method of fusion welding parts having joining edges about 1/8 inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising smoothing said joining edges so that good contact can be had therebetween, beveling the bottom edge portions of said parts along said joining edges so that when their top edge portions are in contact with one another their bottom edge portions are separated from one another by an amount sufficient to permit the edge portions of said parts at said joining edges to drop down and away from one another without coming into contact with one another when rendered molten during welding, supporting said parts with said top edge portions of said joining edges in contact with one another and with their bottom surfaces on each side of said joining edges resting on a backing member having a grooved portion of stainless steel located immediately under the joining edges of said parts, said grooved portion being proportioned so that the joining edge portions of said parts when rendered molten are free to drop down a limited amount, progressively applying heat lengthwise of the top edge portions of the joining edges of said parts to render them sufficiently molten to drop down and away from one another and form a gap between said parts, and as said joining edges of said parts become molten and drop down and away from one another supplying molten filler material in sufficient quantity to fill the gap between said parts and thereby complete a weld between them.

5. The method of fusion welding parts having edge portions greater than 1/8 inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising beveling the top edge portions of said parts to form joining edges about 1/8 inch thick, smoothing said joining edges so that good contact can be had therebetween, beveling the bottom edge portions of said parts along said joining edges so that when their top edge portions are in contact with one another their bottom edge portions are separated from one another by an amount sufficient to permit the edge portions of said parts at said joining edges to drop down and away from one another without coming into contact with one another when rendered molten during welding, supporting said parts with said top edge portions of said joining edges in contact with one another and with their bottom surfaces on each side of said joining edges resting on a backing member having a grooved portion of stainless steel located immediately under the joining edges of said parts, said grooved portion being sufficiently wide so that the joining edge portions of said parts when rendered molten are free to drop down a limited amount, progressively applying heat lengthwise of the top edge portions of the joining edges of said parts to render them sufficiently molten to drop down and away from one another and form a gap between said parts, and as said joining edges of said parts become molten and drop down and away from one another supplying molten filler material in sufficient quantity to fill the gap between said parts and thereby complete a weld between them.

6. The method of reducing the amount of drop down required to obtain complete fusion at the bottom of a weld between metallic parts having joining edges about 1/8 inch thick which when rendered molten freeze rapidly and have a surface skin which not only increases the surface tension effect and size of said molten edges but also prevents them from wetting one another and intermingling, said method comprising preparing said joining edges of said parts and positioning said parts relatively to one another so that the top edge portions of said joining edges of said parts make a good contact with one another along their lengths and so that when said top edge portions of said joining edges are in contact with one another their bottom edge portions are sufficiently spaced from one another along their lengths by an outwardly opening gap which separates the bottom edge portions of said joining edges of said parts by an amount sufficient to permit said joining edges of said parts to drop down and away from one another without coming into contact with one another when rendered molten during welding, supporting said parts with their said joining edges in contact with one another and so that their bottom edge portions at said joining edges are free to drop down when rendered molten, applying a welding agency to the top surfaces of said edge portions of said parts, traversing said welding agency and said edge portions of said parts relatively to one another, controlling the heat of said welding agency and the rate of relative travel between said welding agency and said edge portions of said parts to render said edge portions of said parts sufficiently molten to drop down and away from one another and form a gap between said parts, and simultaneously with said fusion of said edge portions of said parts by said welding agency supplying filler material to said welding agency and fusing it thereby in sufficient quantity to fill the gap between said parts and thereby complete a weld between them.

7. The method of reducing the amount of drop down required to obtain complete fusion at the bottom of a weld between metallic parts having joining edges about 1/8 inch thick which when rendered molten freeze rapidly and have a surface skin which not only increases the surface tension effect and size of said molten edges but also prevents them from wetting one another and intermingling, said method comprising smoothing said joining edges so that good contact can be had therebetween, beveling the bottom edge portions of said parts along said joining edges so that when their top edge portions are in contact with one another their bottom edge portions are separated from one another by an amount sufficient to permit the edge portions of said parts at said joining edges to drop down and away from one another without coming into contact with one another when rendered molten during welding, supporting said parts with the top edge portions of said joining edges in contact with one another and with their said bottom edge portions free to drop down when rendered molten, applying a welding agency to the top surfaces of said edge portions of said parts, traversing said welding agency and said edge portions of said parts relatively to one another, controlling the heat of said welding agency and the rate of relative travel between said welding agency and said edge portions of said parts to render said edge portions of said parts sufficiently molten to drop down and away from one another and form a gap between said parts, and simultaneously with said fusion of said edge portions of said parts by said welding agency supplying filler material to said welding agency and fusing it thereby in sufficient quantity to fill the gap between said parts and thereby complete a weld between them.

8. The method of fusion welding parts about ⅛ inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising preparing the joining edges of said parts and positioning said parts relatively to one another so that the top edge portions of said joining edges of said parts make good contact with one another along their lengths and so that when said top edge portions of said joining edges are in contact with one another their bottom edge portions are spaced from one another along their lengths by an outwardly opening gap at least .005 inch in width at the bottom edge portions of said joining edges of said parts, supporting said parts with their said joining edges in contact with one another and so that their bottom edge portions at said joining edges are free to drop down when rendered molten, maintaining an arc between a tungsten electrode and the top surfaces of said parts at said joining edges, supplying an atmosphere of shielding gas selected from the group consisting of argon and helium about the arcing terminal of said electrode and the portions of said parts rendered molten by said arc, traversing said arc and said edge portions of said parts relatively to one another, controlling the heat of said arc and the rate of relative travel between said arc and said edge portion of said parts to render said edge portions of said parts sufficiently molten to drop down and away from one another and form a gap between said parts, and simultaneously with said fusion of said edge portion of said parts supplying molten metal to fill the gap and complete the weld between said parts by uniformly feeding to said arc the end of a filler rod which is of substantially the same composition as said parts and which is inclined at least 60° away from said electrode and said arc.

9. The method of fusion welding parts about ⅛ inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising preparing the joining edges of said parts and positioning said parts relatively to one another so that the top edge portions of said joining edges of said parts make good contact with one another along their lengths and so that when said top edge portions of said joining edges are in contact with one another their bottom edge portions are spaced from one another along their lengths by an outwardly opening gap of from .005 to .025 inch in width at the bottom edge portions of said joining edges of said parts, supporting said parts with their said joining edges in contact with one another and so that their bottom edge portions at said joining edges are free to drop down when rendered molten, maintaining a direct current arc between a tungsten electrode of positive polarity and the top surfaces of said parts at said joining edges, supplying a shielding gas selected from the group consisting of argon and helium about the arcing terminal of said electrode and the portions of said parts rendered molten by said arc, traversing said arc and said edge portions of said parts relatively to one another, controlling the heat of said arc and the rate of relative travel between said arc and said edge portion of said parts to render said edge portions of said parts sufficiently molten to drop down and away from one another and form a gap between said parts, and simultaneously with said fusion of said edge portion of said parts supplying molten metal to fill the gap and complete the weld between said parts by uniformly feeding to said arc the end of a filler rod which is of substantially the same composition as said parts and which is inclined at least 60° away from said electrode and said arc.

10. The method of fusion welding parts having edge portions greater than ⅛ inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising beveling the top edge portions of said parts to form joining edges about ⅛ inch thick, preparing the joining edges of said parts and positioning said parts relatively to one another so that the top edge portions of said joining edges of said parts make good contact with one another along their lengths and so that when said top edge portions of said joining edges are in contact with one another their bottom edge portions are spaced from one another along their lengths by an outwardly opening gap of at least .005 inch in width at the bottom edge portions of said joining edges of said parts, supporting said parts with their said joining edges in contact with one another and so that their bottom edge portions at said joining edges are free to drop down when rendered molten, maintaining an arc between a tungsten electrode and the top surfaces of said parts at said joining edges, supplying a shielding gas selected from the group consisting of argon and helium about the arcing terminal of said electrode and the portions of said parts rendered molten by said arc, traversing said arc and said edge portions of said parts relatively to one another, controlling the heat of said arc and the rate of relative travel between said arc and said edge portions of said parts to render said edge portions of said parts sufficiently molten to drop down and away from one another and form a gap between said parts, and simultaneously with said fusion of said edge portions of said parts supplying molten metal to fill the gap between said parts by uniformly feeding to said arc the end of a filler rod which is of substantially the same composition as said parts and which is inclined at least 60° away from said electrode and said arc and thereafter supplying additional filler rod to said arc and traversing it and said parts relatively to one another along said beveled top edge portions of said parts a sufficient number of times to fuse said beveled top edge portions and fill the groove formed thereby with molten metal.

11. The method of fusion welding parts having joining edges about ⅛ inch thick formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising beveling the bottom edge portions of said parts along said joining edges so that when their top edge portions are in contact with one another their bottom edge portions are separated from one another by an outwardly opening gap of at least .005 inch in width, supporting said parts with said top edge portions of said joining edges in contact with one another and with their bottom edge portions free to drop down when rendered molten, maintaining a direct current arc between a tungsten electrode of positive polarity and the top surfaces of said parts at said joining edges, supplying a shielding gas selected from the group consisting of argon and helium about the arcing terminal of said electrode and the portions of said parts rendered molten by said arc, traversing said arc and said edge portions of said parts relatively to one another, controlling the heat of said arc and the rate of relative travel between said arc and said edge portions of said parts to render said edge portions of said parts sufficiently molten to drop down and away from one another and form a gap between said parts, and simultaneously with said fusion of said edge portion of said parts supplying molten metal to fill the gap between said parts by uniformly feeding to said arc the end of a filler rod which is of substantially the same composition as said parts and which is inclined at least 60° away from said electrode and said arc.

12. The method of fusion welding parts having joining edges greater than ⅛ inch thick and formed of magnesium, aluminum and alloys and metals having the weight, surface tension and oxidizing characteristics of magnesium and aluminum which causes during welding at the edges to be welded large globular formations of molten metal whose surface skin of oxide prevents them from wetting one another and intermingling to form a weld, said method comprising beveling the top edge portions of said parts to form joining edges about ⅛ inch thick, beveling the bottom edge portions of said parts along said joining edges so that when their top edge portions are in contact with one another their bottom edge portions are separated from one another by an outwardly opening gap of at least .005 inch in width, supporting said parts with said top edge portions of said joining edges in contact with one another and with their bottom edge portions free to drop down when rendered molten, maintaining a direct current arc between a tungsten electrode of positive polarity and the top surfaces of said parts at said joining edges, supplying a shielding gas selected from the group consisting of argon and helium about the arcing terminal of said electrode and the portions of said parts rendered molten by said arc, traversing said arc and said edge portions of said parts relatively to one another, controlling the heat of said arc and the rate of relative travel between said arc and said edge portions of said parts to render said edge portions of said parts sufficiently molten to drop down and away from one another and form a gap between said parts, simultaneously with said fusion of said edge portion of said parts supplying molten metal to fill the gap between said parts by uniformly feeding to said arc the end of a filler rod which is of substantially the same composition as said parts and which is inclined at least 60° away from said electrode and said arc, and thereafter supplying additional filler rod to said welding agency and traversing it and said parts relatively to one another along said beveled top edge portions of said parts a sufficient number of times to fuse said beveled top edge portions and fill the groove formed thereby with molten metal.

FRANK A. WASSELL.